UNITED STATES PATENT OFFICE.

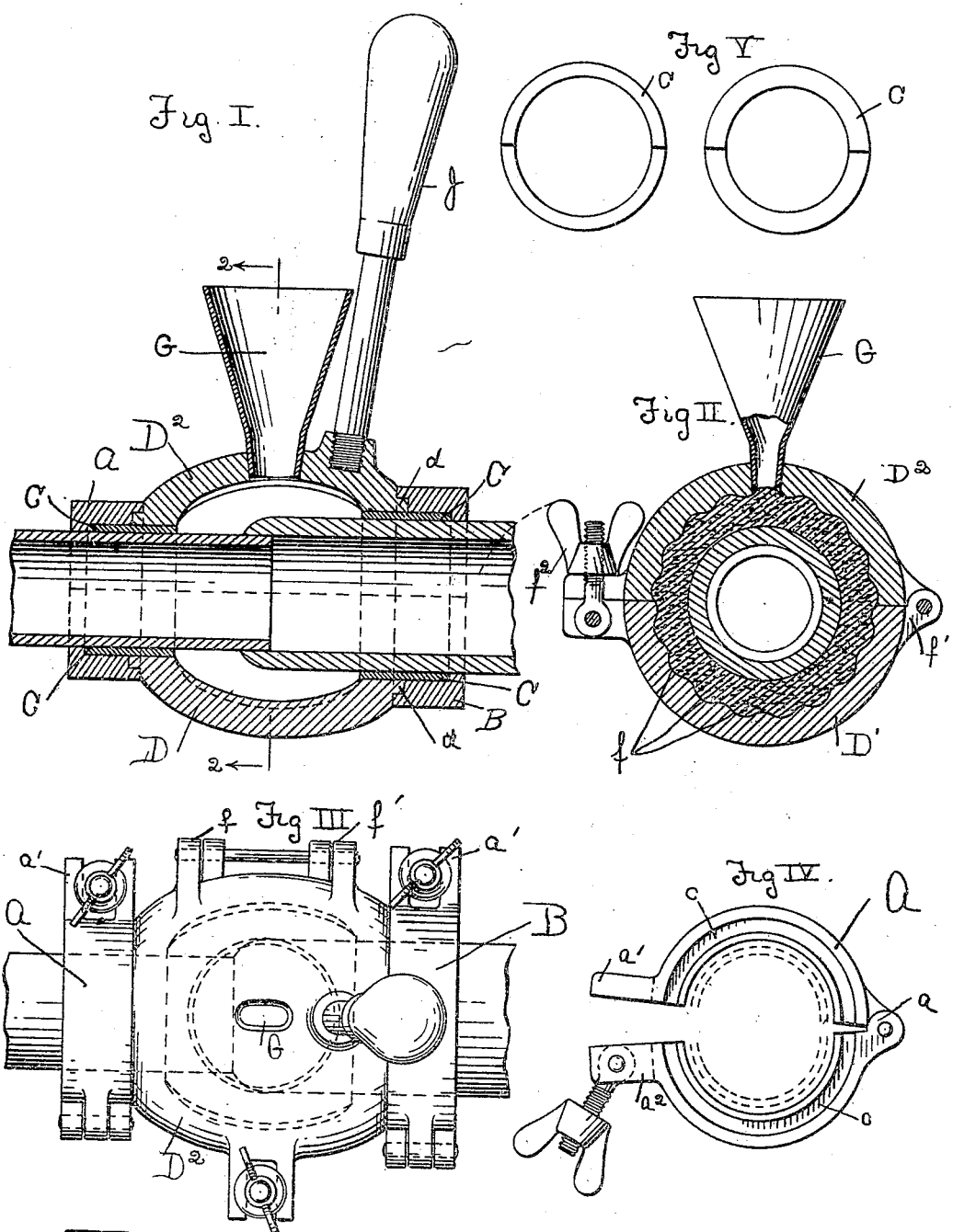

RICHARD M. CORCORAN, OF CLEVELAND, OHIO.

JOINT-FORMER.

No. 801,222.      Specification of Letters Patent.      Patented Oct. 10, 1905.

Application filed May 1, 1905. Serial No. 258,370.

*To all whom it may concern:*

Be it known that I, RICHARD M. CORCORAN, a citizen of the United States, residing at Cleveland, in the county of Cuyahoga and State of Ohio, have invented certain new and useful Improvements in Joint-Formers; and I do hereby declare the following to be a full, clear, and exact description of the invention, such as will enable others skilled in the art to which it pertains to make and use the same.

My invention relates to a device for joining pipes of the same or different diameters, and refers more especially to such joints known as "wiped" joints, whereby the ends of pipes of different metals may be joined, such as lead and brass pipes, and, furthermore, my device is adapted for use in joining electrical cables and the like.

The objects of my invention are, first, to provide a joint wiper and mold which may be secured to the ends of the pipe where they abut or intersect each other.

Another object of my invention is to adapt the device for moving the semifluid solder or metal to be applied to the joint, so as to both tin and wipe the joint, while at the same time prevent its leaking.

Another object is to adapt it to any position of the line of pipe, either horizontal or upright or at any angle between the two.

A further object of this invention is to provide separate collars to adapt the device to different sizes of pipe to form a sealed joint.

With the above objects in view my invention consists in the peculiar construction of the device, whereby all of the above objects are subserved and simplicity in construction and operation are attained.

In the drawings, Figure I is a view in longitudinal section of the device constructed according to my invention and illustrating the two ends of the pipe to be joined of different diameter, in which one of the pipes may be brass and the other lead. This figure also illustrates the handle for attaining the oscillating motion of the mold. Fig. II is a view in cross-section, taken through line 2 2, Fig. I, illustrating the joint set and the corrugated or ribbed interior of the mold. Fig. III is a top plan view of a device constructed according to my invention, showing the same placed in position, having the engaging ends at the top. This adapts the device so that a joint can be made either horizontally or vertically or at any intervening angle. Fig. IV illustrates one of the clamping-rings and the manner of opening, closing, and locking the same in proper relation to the mold contiguous to the ends of the pipe. Fig. V represents the packing-rings located in the interior of the clamping-rings to adapt the device to different-sized pipe.

This device is applicable, as heretofore mentioned, to joining pipes of the same or different diameters or the same or different metals, such as lead and brass and the like.

In carrying out this invention I have provided two clamping-rings A B, each individually adapted to the respective pipes or cables intended to be joined, and they may be adjusted to fit their respective pipes or cables by means of rings of different sizes formed in two parts, as illustrated in Fig. V of the drawings. These rings C are inserted as illustrated in Fig. 1 of the drawings and are preferably made wide at their ends, so as to form a bearing for the aperture in the rings A B and for the ends of the mold which engage the rings A B. These rings A B, as illustrated in Fig. IV, are hinged together, as at $a$, and provided with lugs $a'$ $a^2$ at their opposite sides, one of the lugs $a^2$ being inturned and provided with a bolt upon which the thumb-screw turns, which thumb-screw and bolt engage in the slot $a^4$, formed in the other lug $a'$, and when the thumb-screw is screwed up, as illustrated in Fig. II of the drawings, both parts of the rings are clamped to their respective pipes contiguous to the joints of the same.

Before the clamping-ring is placed in position the joints are properly abutted, prepared, and placed in position in any suitable manner, and the end flange $d$ fits into or is fitted into the annular recess $c$, formed in the ring B, the bushing C keeping the parts in position on the pipe and forming the packing. After the ring B has been placed on its pipe or cable and the ring A placed on its pipe or cable and the ends are properly abutted together the mold, which is composed of two parts, is then placed in position and the rings are tightened, forming a bearing in conjunction with the ring C, whereby the mold may be rotated for wiping and tinning the joint.

The mold is formed of two parts, as illustrated in Fig. II of the drawings, with the interior larger than the exterior of the pipe to be joined, and is roughened or corrugated, so as to form a more or less ornamental joint.

The interior of the mold is fluted, as at $f$, and is hinged, as at $f'$, being locked by suitable locking means, such as is shown at $f^2$.

The parts of the mold are illustrated at $D'$ $D^2$, either part being provided with an ingate G, preferably of funnel shape, for pouring the metal. This ingate is illustrated in Figs. I and II and is shown in dotted lines in Fig. III and is made so as to be readily accessible to the pouring of the metal.

The operation of my device may be readily seen, the mold being placed, as heretofore specified, at the contiguous edges of the pipe or cable and formed so as to be turned or oscillated by a suitable handle J, so that while the metal is hardening the mold can be oscillated slowly until it gets to such a consistency as to indicate that it is going to set. At this point the handle is turned quickly in either direction to press the metal together and to tin the pipe.

In setting forth this invention I have shown a construction as I prefer to make it; but I do not, therefore, wish to be limited to this construction.

What I claim is—

1. A pipe-joint former, comprising two clamping parts, adapted to be locked to the different sections to be united, a hinged or two-part mold, engaging said clamping means, so as to be operated or rotated in connection therewith.

2. A joint-former comprising two clamps adapted to be immovably connected to the contiguous ends of the parts to be connected, a mold operated between said parts and means for allowing the oscillation or rotation of the mold, around the ends to be connected.

3. A joint-former comprising two clamping members immovably connected to different sections of the material to be joined a mold surrounding the material at the part of its juncture, said mold being provided with a space for receiving the melted solder and being roughened or corrugated on its interior, with means for actuating said mold between the clamps.

4. A joint-former of the type set forth, comprising two clamping parts having recesses or means for receiving and retaining enlarging or decreasing dies or rings also means for receiving the ends of the mold in combination with a mold adapted to be rotated or oscillated between said clamping-rings, substantially as set forth.

5. A joint-former of the type set forth composed of two clamping-rings, a mold held by said clamping-rings in such a manner as to allow of the rotation or oscillation of these molds, said molds being fluted or roughened on its interior, substantially as set forth.

Signed at Cleveland, in the county of Cuyahoga and State of Ohio, this 23d day of March, 1905.

RICHARD M. CORCORAN.

Witnesses:
E. B. DONNELLY,
L. C. MARBACH.